Oct. 25, 1949.  V. E. HAMILTON, JR  2,485,877
LAWN EDGING IMPLEMENT
Filed Jan. 16, 1946
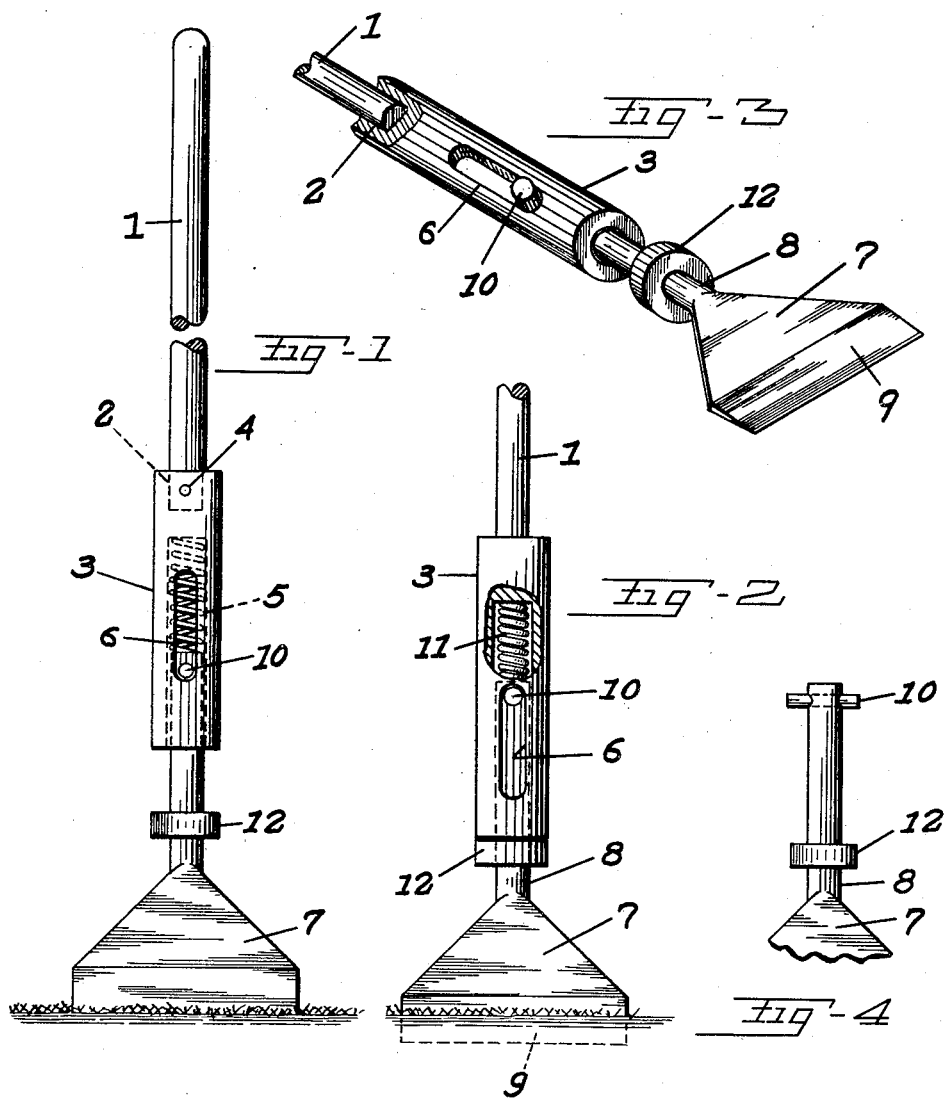
Inventor
VIVIAN E. HAMILTON JR.
By Clarence A. O'Brien
and Harvey B. Jacobson
Attorneys Patented Oct. 25, 1949

2,485,877

UNITED STATES PATENT OFFICE 2,485,877

LAWN EDGING IMPLEMENT

Vivian E. Hamilton, Jr., Shreveport, La.

Application January 16, 1946, Serial No. 641,499

1 Claim. (Cl. 97—227)

My invention relates to improvements in lawn edging implements for trimming lawns along the edges of walks, and the like.

The primary object of the invention is to provide an instrument of simple form and inexpensive, lasting construction which is easier to operate than present-day devices for like purposes, and which obviates bending by the operator together with inaccurate chopping action required by other lawn edging implements, and facilitates accuracy in edging along a straight line.

Another object is to provide an implement of the type above set forth which is operative by easy, quick manipulation of a handle to drive a cutting blade into the ground by percussive force, whereby the blade may be selectively positioned relative to the edge of a lawn before being driven and accuracy in edging thus attained, together with ease of operation.

To the accomplishment of the above, and subordinate objects presently appearing, a preferred embodiment of my invention has been illustrated in the accompanying drawing, set forth in detail in the succeeding description, and defined in the claim appended hereto.

In said drawings:

Figure 1 is a view in front elevation of my improved lawn-edging implement, in the preferred embodiment thereof, Figure 2 is a similar fragmentary view illustrating the manner in which the cutting blade is driven by percussive force, Figure 3 is a fragmentary view in perspective, partly in section, and Figure 4 is a fragmentary view in front elevation of the cutting blade together with the shank thereof and parts on said shank.

Referring to the drawings by numerals, my improved lawn edging implement, as shown, comprises a handle 1 which may be of any straight type and material. The lower, or front end of the handle 1 is fitted for a suitable distance into an axial socket 2 provided in the upper, or rear, end of a cylindrical percussion head 3 of any suitable length. A pin 4, extending through the upper end of said head 3 and through the lower end of said handle 1, secures the handle to the head. The head 3 is provided with an axial bore 5 extending into the same from the lower end of said head and terminating within a short distance of the socket 2. A pair of longitudinally extending slots 6 are provided in diametrically opposite sides of said head 3. The purpose of the bore 5 and slots 6 will presently appear.

A cutting blade 7 is provided and which preferably is formed with a coplanar cylindrical shank 8 fitted into the bore 6 from the lower end of said bore and on which the head 3 is slidable. The cutting blade 7 may be of any suitable shape, such as shown, with a straight edge 9. A transverse pin 10 in the upper end of the shank 8 and extending into the pair of slots 6 limits sliding movement of the head 3 on said shank 8 upwardly. A coil spring 11 in the bore 5 interposed between the upper end of said bore and the upper end of the shank 8 urges said head upwardly of said shank into a fully retracted position as established by engagement of the ends of said pin 10 with the lower ends of the pair of slots 6. A circumferential collar 12 is provided on the shank 8 and which is disposed in advance of the head 3 when said head is fully retracted.

The manner in which the described implement is designed to be operated will be readily understood. With the straight edge 9 of the cutting blade 7 selectively positioned alongside the edge of a lawn and the implement held substantially upright, the handle 1 is thrust downwardly to correspondingly thrust the head 3 downwardly, in opposition to the spring 11, and cause the lower end of said head to impact against the collar 12 so that said head exerts percussive force against said collar and thereby drives the cutting blade into the ground. Upon release of the handle 1, the spring 11 will return the head 3, and handle 1, to fully retracted position for repetition of the operation described.

As will be seen, the described implement involves few parts of simple construction and is therefore inexpensive to manufacture. The head 3 may be easily and quickly operated to effect the desired percussive action, and the cutting blade 7 may be selectively positioned on the lawn, prior to driving the same, so that edging, or trimming, may be easily performed in a straight line.

The foregoing will, it is believed, suffice to impart a clear understanding of my invention without further explanation.

Manifestly, the invention as described is susceptible of modification without departing from the inventive concept, and right is herein reserved to such modifications as fall within the scope of the appended claim.

What I claim is:

In an implement of the class described, an elongated bar like handle adapted to be held upright, a cylindrical hollow percussion head on the lower end of the handle fixed at one end thereto, a cutting blade for driving into the ground and having a shank on which said head is telescopically fitted for sliding toward said blade by downward manipulation of said handle, a spring in said head bearing against the head and shank to yieldingly oppose sliding of said head toward said blade, and an impact receiving collar on said shank against which said head is movable by downward sliding thereof to drive said blade into the ground.

VIVIAN E. HAMILTON, Jr.

REFERENCES CITED

The following references are of record in the file of this patent:

UNITED STATES PATENTS

| Number | Name | Date |
|---|---|---|
| 1,221,650 | Atkins | Apr. 3, 1917 |
| 1,454,018 | Lees | May 1, 1923 |